United States Patent
Förster

(10) Patent No.: US 8,485,224 B2
(45) Date of Patent: Jul. 16, 2013

(54) ADJUSTABLE DAMPING VALVE DEVICE

(75) Inventor: Andreas Förster, Schweinfurt (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 616 days.

(21) Appl. No.: 12/753,387

(22) Filed: Apr. 2, 2010

(65) Prior Publication Data
US 2010/0252766 A1 Oct. 7, 2010

(30) Foreign Application Priority Data

Apr. 4, 2009 (DE) .......................... 10 2009 016 464
Apr. 4, 2009 (DE) .......................... 10 2009 061 003

(51) Int. Cl.
| F03B 1/00 | (2006.01) |
| F16K 1/20 | (2006.01) |
| F16K 31/12 | (2006.01) |
| F16F 9/34 | (2006.01) |

(52) U.S. Cl.
USPC ................. 137/614.11; 188/266.5; 188/266.6; 251/30.04; 251/30.05

(58) Field of Classification Search
USPC ............ 137/614.11; 188/266.2, 266.5, 266.6, 188/267, 299.1; 251/129.15
See application file for complete search history.

(56) References Cited

U.S. PATENT DOCUMENTS

| 5,085,299 A | 2/1992 | Spiess et al. |
| 5,090,525 A * | 2/1992 | Ohlin .......................... 188/266.5 |
| 5,129,490 A | 7/1992 | Kuehle et al. |
| 5,301,776 A * | 4/1994 | Beck .......................... 188/322.13 |
| 5,386,893 A | 2/1995 | Feigel |
| 5,413,196 A | 5/1995 | Forster |
| 5,850,896 A * | 12/1998 | Tanaka ........................ 188/266.2 |
| 5,960,915 A * | 10/1999 | Nezu et al. ................. 188/266.6 |
| 6,047,718 A * | 4/2000 | Konsky et al. .................... 137/1 |
| 7,377,290 B2 * | 5/2008 | Albert et al. ................... 137/375 |
| 2007/0209892 A1 * | 9/2007 | Masamura .................... 188/266 |

FOREIGN PATENT DOCUMENTS

| DE | 38 14480 | 11/1989 |
| DE | 39 17 064 | 11/1990 |
| DE | 10 2006 043 849 | 3/2008 |
| EP | 534 075 | 3/1993 |
| EP | 0 561 404 | 9/1993 |

* cited by examiner

*Primary Examiner* — John Rivell
*Assistant Examiner* — Frederick D Soski
(74) *Attorney, Agent, or Firm* — Cozen O'Connor

(57) ABSTRACT

An adjustable damping valve device, for a vibration damper, includes a first valve and emergency operation valve, both of which are actuated by a shared solenoid. The emergency operation valve carries out a relative movement relative to the first valve when passing from the emergency operation position into normal operation. A magnetic flux guiding element is arranged in the magnetic flux between the first valve and the emergency operation valve and determines the magnetic flux for the emergency operation valve and for the first valve.

20 Claims, 3 Drawing Sheets

ADJUSTABLE DAMPING VALVE DEVICE

BACKGROUND OF THE INVENTION

1. Field of the Invention

The invention is directed to an adjustable damping valve device having a first valve and an emergency operation valve operated by a shared solenoid.

2. Description of the Related Art

Depending upon the design principle, a damping valve that is adjustable by a magnetic force adopts a particularly soft or a particularly hard damping force characteristic in a currentless state. This effect is produced at least by a spring force against which the magnetic force must act. In case of an outage of the magnetic force, e.g., due to cable breakage, the spring force displaces a valve body into an end position. Assuming that a high damping force also represents high safety reserves for a chassis of a vehicle, then the basic operating principle is advantageous, since the safety device for the adjustable damping valve already exists in practice without further expenditure.

It is known from EP 0 561 404 B1 or DE 39 17 064 A1 that it is not necessarily the hardest damping force adjustment that is sought as an emergency operation characteristic, but rather a moderate damping force characteristic. EP 0 561 404 B1, FIG. 2 shows an adjustable damping valve device that comprises a pilot valve device and a main valve device. The damping force of the damping valve device is adjusted through the flow-off of damping medium from a control space of the main valve.

The pilot valve device comprises a pilot control valve and an emergency operation valve. The two valves are arranged in series with respect to the flow path of the damping medium from the control space (FIG. 2). Even with a small energizing current, the emergency operation valve (529a) opens and completely releases the flow-off (26i). Only cross section 26i works in the emergency operation position and therefore determines, e.g., a medium damping force adjustment.

In a variant according to FIG. 6 in EP 0561 404 B1, the pilot valve device likewise comprises an emergency operation valve hydraulically connected in parallel to the pilot valve. This poses the problem that a malfunction of the emergency operation valve also affects the damping force adjustment of the pilot valve.

The construction principles in both FIG. 2 and FIG. 6 present the difficulty that the axially movable valve body of the pilot valve and the emergency operation valve body are in direct contact, and the emergency operation valve carries out a displacing movement on the valve body of the pilot valve starting from the emergency operation position into the normal operation position.

The two valve bodies of the pilot valve device must be able to move very smoothly relative to one another. This results in small annular gaps which, on the one hand, bring about internal leakage that influences the damping force adjustment and, on the other hand, impair the guiding of the valve body relative to the solenoid.

These difficulties can be overcome, but the expenditure on fabrication required for this purpose adds to production costs.

SUMMARY OF THE INVENTION

It is an object of the present invention to realize a damping valve device in which an adjustable valve and an emergency operation valve can be controlled by an individual solenoid and the problems known from the prior art relating to internal leakage and the required dimensional stability of the structural component parts can be minimized.

According to one embodiment of the invention, a magnetic flux guiding element is arranged in the magnetic flux between the first valve and the emergency operation valve that determines the magnetic flux for the emergency operation valve and for the first valve.

The first valve and the emergency operation valve can be spatially separated by the magnetic flux guiding element. The problems relating to the internal leakage of the damping valve device are also solved by the spatial separation.

In a first embodiment of the invention, the first valve and the emergency operation valve are arranged axially in series and the magnetic flux guiding element is arranged therebetween.

The magnetic flux guiding element preferably has the smallest possible magnetic flux resistance, e.g., soft iron.

According to one embodiment of the invention, the magnetic flux leads through the valve body of the emergency operation valve, via the magnetic flux guiding element, into the valve body of the first valve. The first valve and the emergency operation valve lie in series with respect to the magnetic flux so that the magnetic flux in its entirety can flow through the first valve and, consequently, high actuating forces are possible.

In another advantageous embodiment, the magnetic flux guiding element has a through-opening for a valve body of the first valve.

The magnetic flux guiding element takes on an additional function in that it supports the valve body of the first valve.

The valve body is formed of multiple parts in the movement direction to compensate for manufacturing tolerances in the relevant structural component parts within the damping device. At least two length portions of the valve body carry out an angular movement relative to one another.

The magnetic flux guiding element is fixed in a housing of the damping valve device. Together with the housing and the solenoid, the first valve, when installed, forms a constructional unit whose function can be checked independently from other components.

Another step for facilitating the adjustment of the first valve is that a spring assembly acting in the opposite direction supports the valve body of the first valve in a floating manner. In so doing, it is ensured that at least one spring collar for a spring of the spring assembly is accessible for purposes of adjustment when the first valve is installed.

The spring collar for the spring is accessible via the through-opening in the magnetic flux guiding element. It is possible to change the resulting spring force of the spring assembly by displacing the spring collar.

For the purpose of the most uniform possible transmission of force to the valve body of the emergency operation valve, the latter is constructed in an annular manner and is arranged concentric to the valve body of the first valve.

A preloading spring of the emergency operation valve is supported at the magnetic flux guiding element for a compact construction of the damping valve device.

The emergency operation valve is constructed as a poppet valve and is therefore especially impervious to leakage.

A valve seat surface of the emergency operation valve is constructed at a housing of the damping valve device.

In one embodiment of the invention, the emergency operation valve and the first valve are arranged coaxially at a radial distance relative to one another, the magnetic flux guiding element being arranged between the two valves.

The magnetic flux guiding element preferably has a high magnetic flux resistance. The high magnetic flux resistance can be achieved through the choice of material or by comparatively small end faces of the magnetic flux guiding element. In principle, small transitional surfaces have a high magnetic flux resistance. The emergency operation valve and the first valve are arranged in a parallel connection with respect to the magnetic flux. In this variant, there is a defined ratio between the magnetic flux for the emergency operation valve and for the first valve.

The magnetic flux guiding element is formed by a sleeve and can be cut to length, e.g., from a stainless steel or plastic pipe.

The valve body of the first valve is centered at the magnetic flux guiding element to facilitate the guiding of the valve body in question.

The magnetic flux guiding element can easily be fixed in the housing in that it is preloaded in longitudinal direction with respect to the valve body of the first valve in the housing of the damping valve device.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention will be described in more detail with reference to the following description of the figures.

The drawings show.

DETAILED DESCRIPTION OF THE PRESENTLY PREFERRED EMBODIMENTS

Figure 1:
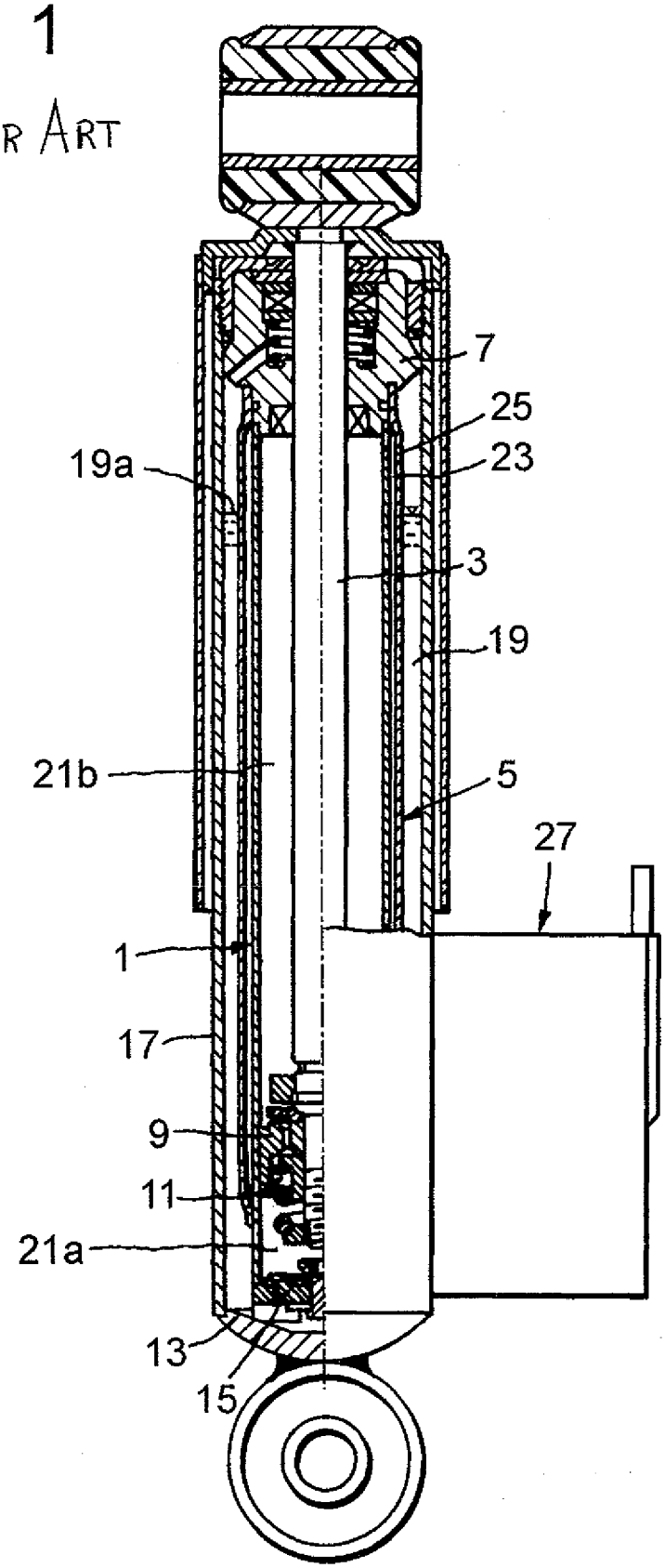
FIG. 1 is a vibration damper with a damping valve device.

In FIG. 1, a vibration damper has a cylinder 1 in which a piston rod 3 is arranged so as to be axially movable. A guiding and sealing unit 7 guides the piston rod 3 out of the upper end of the cylinder. A piston unit 9 with a piston valve arrangement 11 is fastened to the piston rod 3 inside the cylinder 1. A base plate 13 with a bottom valve arrangement 15 closes the bottom end of the cylinder 1. A reservoir tube 17 encloses the cylinder 1. The reservoir tube 17 and an intermediate tube 5 form an annular space 19 presenting a compensation chamber. The space within the cylinder 1 is divided by the piston unit 9 into a first work chamber 21a and a second work chamber 21b. The work chambers 21a and 21b are filled with damping fluid. The compensation chamber 19 is filled with liquid up to level 19a and, above that, with gas. A first line section, namely, a high-pressure section 23 which communicates with the second work chamber 21b via a bore hole 25 of the cylinder 1 is formed inside the compensation chamber 19. Adjoining this high-pressure section is an adjustable damping valve device 27, which is fitted laterally to the reservoir tube 17. A second line section, namely, a low-pressure section 2, leads from the adjustable damping valve device 27 into the compensation chamber 19

When the piston rod 3 moves upward out of the cylinder 1, the upper work chamber 21b becomes smaller. An overpressure builds up in the upper work chamber 21b, which overpressure can only be decreased by the piston valve arrangement 11 in the lower work chamber 21a as long as the adjustable damping valve 27 is closed. When the adjustable damping valve 27 is opened, liquid flows simultaneously from the upper work chamber 21b through the high-pressure section 23 and the adjustable damping valve 27 into the compensation chamber 19. Accordingly, when the piston rod 3 moves out, the damping characteristic of the vibration damper depends on the degree to which the adjustable damping valve 27 is open or closed.

When the piston rod 3 moves into the cylinder 1, an overpressure forms in the lower work chamber 21a. Liquid can pass upward from the lower work chamber 21a through the piston valve arrangement 11 into the upper work chamber 21b. The liquid displaced by the increasing piston rod volume within the cylinder 1 is expelled through the bottom valve arrangement 15 into the compensation chamber 19. An increasing pressure also occurs in the upper work chamber 21b because the flow resistance of the piston valve arrangement 11 is less than the flow resistance of the bottom valve arrangement 15. This increasing pressure can again flow through the high-pressure section 23 into the compensation space 19 when the damping valve 27 is opened. This means that when the damping valve 27 is opened the shock absorber also has a softer characteristic when moving in when the adjustable damping valve 27 is open and a harder characteristic when the damping valve 27 is closed, just as when the piston rod moves out. It should be noted that the flow direction through the high-pressure section 23 of the bypass is always the same regardless of whether the piston rod moves in or out.

Figure 2:
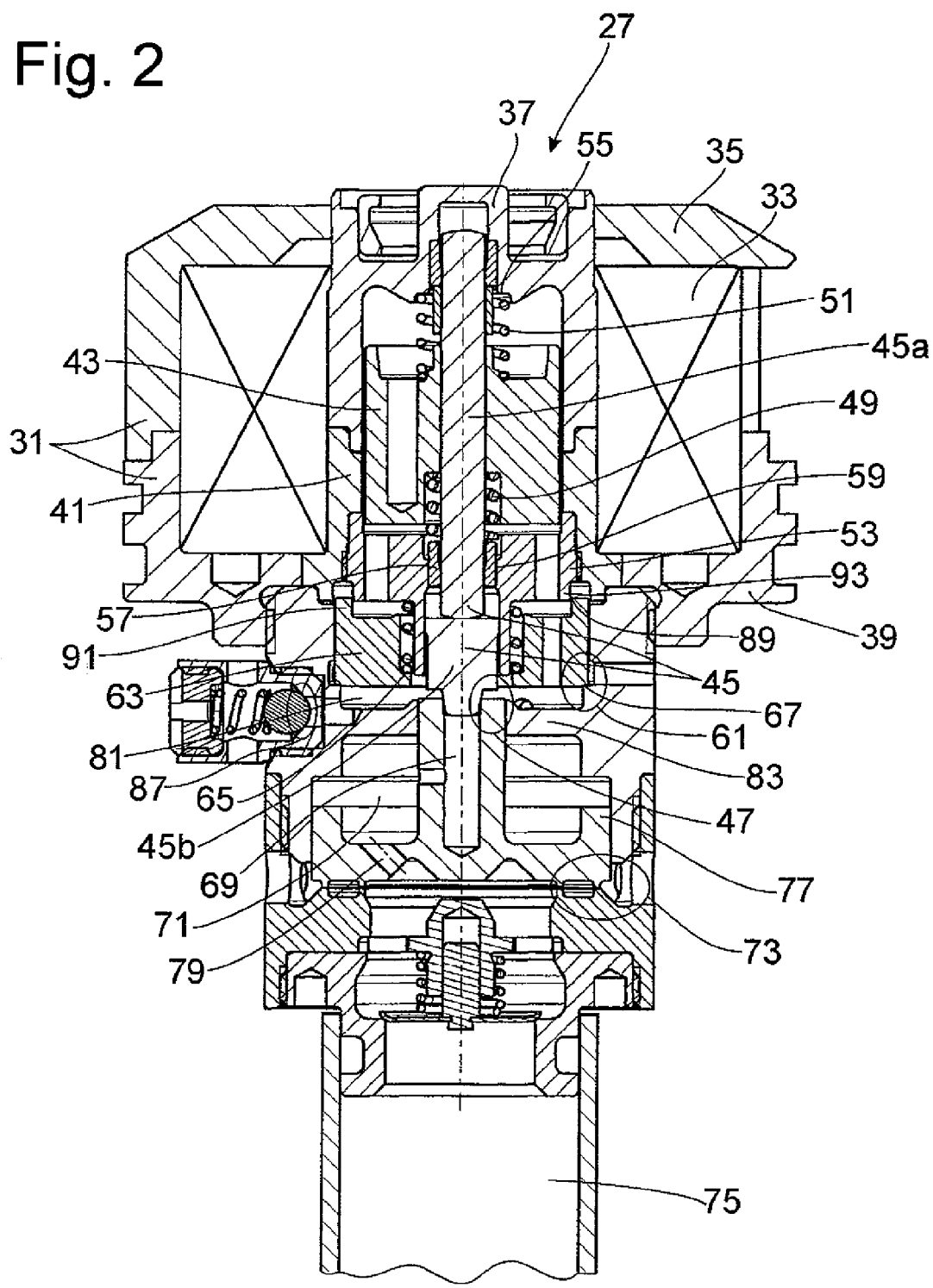
FIG. 2 is a damping valve device with a first valve and an emergency operation valve arranged in series.

FIG. 2 shows the damping valve device 27 in a housing 31, which is fastened externally to the reservoir tube 17 or inside the cylinder 1, e.g., to the piston rod 3. An annular solenoid 33 is arranged in the housing 31. A back closing sleeve 37 with a base closes an opening of a housing cover 35. An insulator 41 for insulating the solenoid 33 from the magnetic flux is arranged between a bottom housing part 39 and the back closing sleeve 37.

A valve armature 43, together with a valve body 45 of a first valve 47, is supported in an axially floating manner against the force of a spring assembly acting on both sides of the valve armature 43 and accordingly also on both sides of the valve body 45. The spring assembly comprises, per side, at least one spring 49 acting in the direction opposite to the spring 51 on the other side of the valve armature 43. A magnetic flux guiding element 53, which has only a small magnetic flux resistance, i.e., has good magnetic conductivity, is fixed to the bottom housing part 39.

The valve body 45 of the first valve 47 is supported in the base of the back closing sleeve 37 on one hand and in the magnetic flux guiding element 53 on the other hand. A first spring collar 55 for the at least one spring 51 is formed by the back closing sleeve 37. A second spring collar 57 engages in a through-opening 59 of the magnetic flux guiding element 53 through which the valve body 45 of the first valve element 47 also extends. The second spring collar 57 is accessible through the through-opening 59 and forms an interference fit. This makes it possible for the second spring collar 57 to be axially displaceable within limits when the magnetic flux guiding element 53 is already installed, so that the spring assembly 49, 51 can be re-tensioned. Manufacturing tolerances, if any, can be compensated for by the re-tensioning.

An emergency operation valve 61 is arranged axially in series with the first valve 47 in the housing 31. The magnetic flux guiding element 53 is arranged between the two valves 47, 61. A valve body 63 of the emergency operation valve 61 is constructed annularly and is arranged concentric to the valve body 45 of the first valve 47. A preloading spring 65 supported at the magnetic flux guiding element 53 tensions the valve body 63 of the emergency operation valve 61 on a valve seat surface 67 of the housing 31. This emergency operation valve 61 is constructed as a poppet valve.

The valve body 45 of the first valve 47 is formed of multiple parts in its movement direction. At least two length portions 45a, 45b of the valve body 45 can execute an angular movement relative to one another. The length portion 45b is supported inside the through-opening 59 of the magnetic flux guiding element 53 so as to be movable angularly and is moved at the front by the length portion 45a connected to the valve armature 43.

The second length portion 45b of the first valve 47 acts on a flow-off opening 69 of a control space 71, a main valve 73 controlled by the first valve 47. The main valve 73 is connected to a work space 21a, 21b of the vibration damper via a connection piece 75. The damping medium exerts a lifting force on a main valve body 77 acting against a closing force of the first valve 47. In addition, a pressure of the damping medium in the control space 71 connected to the connection piece 75 by a connection opening 79 in the main valve 73 exerts a closing force on the main valve body 77. Depending upon the hold-down force of the first valve 47 on the flow-off opening 69 of the main valve 73, the main valve body 77 is lifted from its valve seat surface so that the damping medium can flow off radially into compensation space 19 or a work space of the vibration damper via the valve seat.

The hold-down force of the first valve 47 is determined by the energization through the solenoid 33. A large energization leads to a high hold-down force, and there is minimum hold-down force in the currentless state. In particular, at the lowest energization, the damping medium can flow into an intermediate space 81 of the housing 31 extending between an underside of the magnetic flux guiding element 53 and an upper side of an intermediate wall 83 of the housing 85 to the main valve 73. The flow-off out of this intermediate space is determined by the emergency operation valve 61 and, as the case may be, by a pressure relief valve 87. In the currentless state, the emergency operation valve 61 is held in a closing position on the valve seat surface 67 by the preloading spring 65. With respect to the flow path of the damping medium proceeding from the connection piece 75, the first valve 47 and the emergency operation valve 61 are arranged in series.

At a low energization, a magnetic flux is initiated which continues from the bottom housing part 39 radially into the valve body 63 of the emergency operation valve 61. The resistance between an edge 89 of the valve body 63 and the magnetic flux guiding element 53 is less than that between the valve seat surface 67 and the valve body 63, so that the magnetic flux exerts a lifting force on the valve body 63 in direction of the magnetic flux guiding element 53. The magnetic flux continues over the length portion of the valve body 45a of the first valve, which length portion is located in the valve armature 43, to the valve armature and to the back closing sleeve 37. The small current is not yet sufficient to move the first valve body 45 of the first valve 47 significantly in direction of the flow-off opening 69. The air gap adjusted between the valve armature 43 and the upper side of the magnetic flux guiding element 53 by the spring assembly 49, 51 is not overcome until the energization is high. When the emergency operation valve 61 is open, the magnetic resistance decreases again during the transition from the bottom housing part 39 via the valve body 63 of the emergency operation valve 61 to the magnetic flux guiding element 53, since the radial overlapping between a circumferential web 91 of the valve body 63 of the emergency operation valve 61 and a shoulder 93 at the magnetic flux guiding element 53 increases with the lifting movement of the emergency operation valve 61.

When there is no current applied to the solenoid 33 and the emergency operation valve 61 is closed, a pressure relief valve 87 is available which makes it possible for damping medium to flow off from the intermediate space 65 into a work space 21a, 21b or compensation space 19 and accordingly prevents an overloading of the entire vibration damper.

Figure 3:
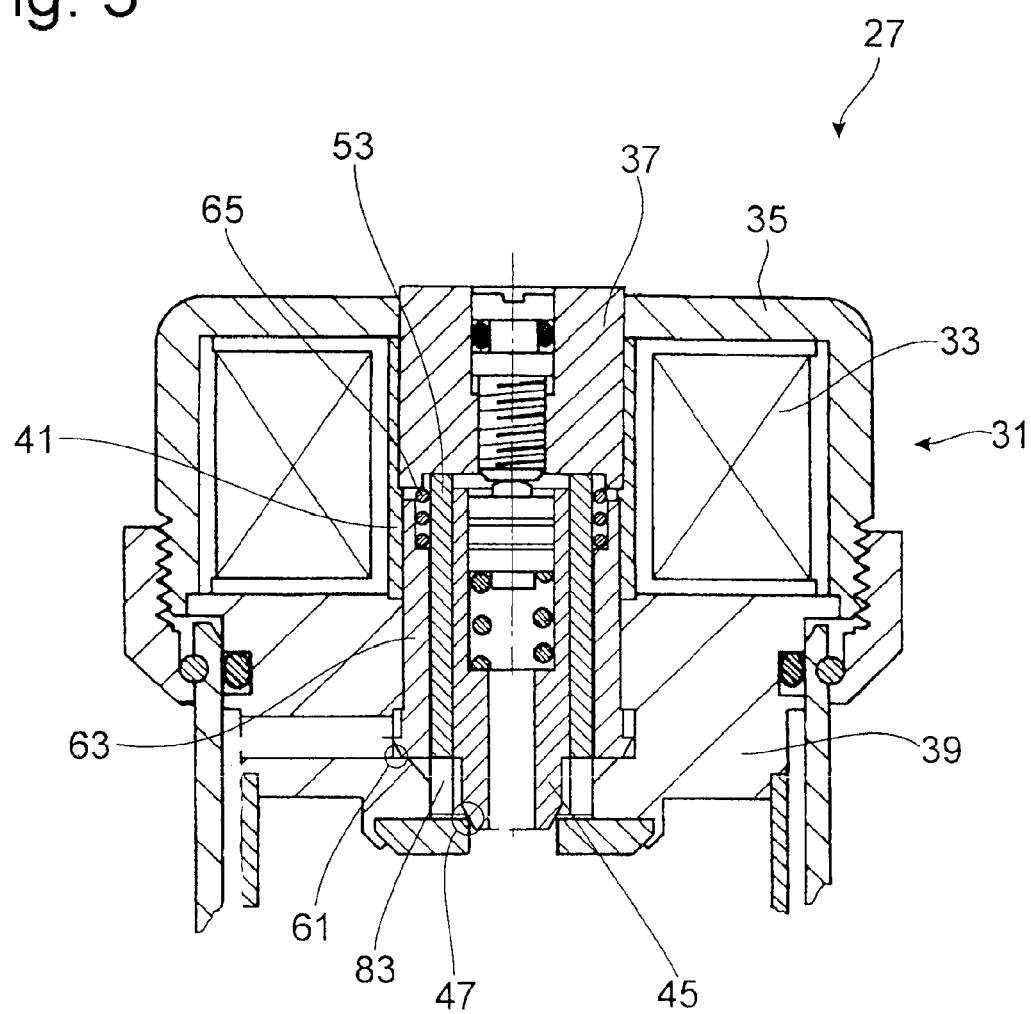
FIG. 3 is a damping valve device with a coaxial arrangement of the first valve relative to the emergency operation valve.

The variant according to FIG. 3 shows a damping valve device 27 limited to the first valve and the emergency operation valve 61. The construction of the main valve 73 is optional. The invention according to the embodiment of FIGS. 2 and 3 also functions without a main valve. In this case, the first valve is the damping valve. The emergency operation valve 61 and the first valve are likewise arranged in series with respect to the flow path of the damping medium.

In contrast to FIG. 2, in FIG. 3, the emergency operation valve 61 and the first valve 47 are arranged coaxially at a distance from one another, i.e., the valve body 63 of the emergency operation valve 61 at least partially envelopes the valve body 45 of the first valve 47. The magnetic flux guiding element 53, which is likewise formed by a sleeve, is arranged in the annular space between the two valve bodies 45, 63. The magnetic flux guiding element 53 is preloaded between the back closing body 37 and the bottom housing part 39 in longitudinal direction to the valve body 45 of the first valve 47. The magnetic flux guiding element 53 has a high magnetic flux resistance and, for example, is made of plastic or stainless steel. Alternatively, a material with good conductivity, but with a high magnetic flux resistance owing to small end faces can also be used. In the present variant, this small end face is achieved by small segments, which are separated from one another by transverse grooves.

The valve body 45 of the first valve 47 is centered at the inner wall of the magnetic flux guiding element 53. The valve body 63 of the emergency operation valve 61 in turn can be centered with its outer diameter at the housing or bottom housing part 39 and the insulator 41 so that there can be a residual gap between the valve body 63 of the emergency operation valve 61 and the magnetic flux guiding element 53, which does not impair the function of the damping valve device owing to the series connection of the two valve bodies.

When the solenoid 33 is energized, two parallel magnetic fluxes are introduced, which flow through the two valve bodies 45, 63 and flow together again in the housing 33, 35. The magnetic resistances, which in turn determine the splitting of the magnetic fluxes, can be dimensioned by the shape of the valve body cross sections in direction of the back closing body 37.

A pressure relief valve which is connected in parallel to the emergency operation valve 61 in the flow path can also be provided in this variant for the flow-off from the intermediate space 83 between the first valve 47 and the emergency operation valve 61.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps, which perform substantially the same function in substantially the same way to achieve the same results, are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. An adjustable damping valve device for a vibration damper, comprising:
   a solenoid;
   a first valve configured to be actuated by the solenoid;
   an emergency operation valve configured to be actuated by the solenoid, the emergency operation valve carries out a movement relative to the first valve when passing from an emergency operation position into a normal operation; and
   a magnetic flux guiding element arranged in a magnetic flux between the first valve and the emergency operation valve that determines an emergency operation valve magnetic flux and a first valve magnetic flux, wherein the first valve and the emergency operation valve are actuated only by the solenoid.

2. The adjustable damping valve device according to claim 1, wherein the first valve and the emergency operation valve are arranged axially in series, and the magnetic flux guiding element is arranged therebetween.

3. The adjustable damping valve device according to claim 1, wherein the magnetic flux guiding element has a smallest possible magnetic flux resistance.

4. The adjustable damping valve device according to claim 1, wherein a valve body of the first valve is formed of multiple parts in the movement direction, wherein at least two length portions of the valve body are configured to carry out an angular movement relative to one another.

5. The adjustable damping valve device according to claim 1, wherein the magnetic flux guiding element itself is fixed in a housing of a damping valve device.

6. The adjustable damping valve device according to claim 1, wherein a spring assembly supports a valve body of the first valve in a floating manner.

7. The adjustable damping valve device according to claim 1, wherein an annular valve body of the emergency operation valve is arranged concentric to a valve body of the first valve.

8. The adjustable damping valve device according to claim 1, wherein the emergency operation valve is a poppet valve.

9. The adjustable damping valve device according to claim 1, wherein the emergency operation valve and the first valve are arranged coaxially at a radial distance relative to one another, and the magnetic flux guiding element is arranged between the emergency operation valve and the first valve.

10. The adjustable damping valve device according to claim 2, wherein the magnetic flux leads through a valve body of the emergency operation valve into a valve body of the first valve via the magnetic flux guiding element.

11. The adjustable damping valve device according to claim 2, wherein the magnetic flux guiding element further comprises a through-opening for a valve body of the first valve.

12. The adjustable damping valve device according to claim 2, wherein a valve body of the first valve is supported by the magnetic flux guiding element.

13. The adjustable damping valve device according to claim 2, wherein a preloading spring of the emergency operation valve is supported at the magnetic flux guiding element.

14. The adjustable damping valve device according to claim 6, wherein at least one spring collar for a spring of the spring assembly is accessible for at least adjustment when the first valve is installed.

15. The adjustable damping valve device according to claim 11, wherein the at least one spring collar for the spring is accessible via a through-opening in the magnetic flux guiding element.

16. The adjustable damping valve device according to claim 8, wherein a valve seat surface of the emergency operation valve is constructed at a housing of the damping valve device.

17. The adjustable damping valve device according to claim 9, wherein the magnetic flux guiding element has a high magnetic flux resistance.

18. The adjustable damping valve device according to claim 9, wherein the magnetic flux guiding element is a sleeve.

19. The adjustable damping valve device according to claim 18, wherein a valve body of the first valve is centered at the magnetic flux guiding element.

20. The adjustable damping valve device according to claim 18, wherein the magnetic flux guiding element is preloaded in longitudinal direction with respect to a valve body of the first valve in a housing of the damping valve device.

* * * * *